(12) United States Patent
Suib et al.

(10) Patent No.: US 11,492,265 B2
(45) Date of Patent: Nov. 8, 2022

(54) MESOPOROUS TUNGSTEN OXIDE COMPOSITION

(71) Applicant: University of Connecticut, Farmington, CT (US)

(72) Inventors: Steven L. Suib, Storrs, CT (US); Tharindu M. P. K. Kapuge, Vernon, CT (US); Wimalika R. K. Thalgaspitiya, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 678 days.

(21) Appl. No.: 16/456,003

(22) Filed: Jun. 28, 2019

(65) Prior Publication Data
US 2020/0024152 A1 Jan. 23, 2020

Related U.S. Application Data

(60) Provisional application No. 62/697,567, filed on Jul. 13, 2018.

(51) Int. Cl.
*C01G 41/02* (2006.01)
*B01J 23/652* (2006.01)

(52) U.S. Cl.
CPC .......... *C01G 41/02* (2013.01); *B01J 23/6527* (2013.01)

(58) Field of Classification Search
CPC .............................. C01G 41/02; B01J 23/6527
See application file for complete search history.

(56) References Cited

U.S. PATENT DOCUMENTS 7,579,511 B1   8/2009   Dakka et al.

FOREIGN PATENT DOCUMENTS

| JP | 2009233575 A | * | 10/2009 | .............. B01J 23/30 |
| WO | WO 2007/104798 A2 | | 9/2007 | |

OTHER PUBLICATIONS

Poyraz, A.S. et al., "A general approach to crystalline and monomodal pore size mesoporous materials," Nature Communications, 4:2952 (2013), pp. 1-10.
Mahindaratne, M., P.D. and Wimalasena, K., "Detailed Characterization of p-Toluenesulfonic Acid Monohydrate as a Convenient, Recoverable, Safe, and Selective Catalyst for Alkylation of the Aromatic Nucleus," J. Org. Chem., 63:9 (1998), pp. 2858-2866.
Hoefnagel, A.J. and van Bekkum, H., "Selective alkylation of methylbenzenes with cyclohexene catalyzed by solid acids," Catalysis Letters, 85:1-2 (Jan. 2003), pp. 7-11.
Pizzio, L.R. et al., "C-alkylation reactions catalyzed by silica-supported Keggin heteropolyacids," Applied Catalysis A: General, 287:1-8 (2005), pp. 1-8.
Yamanaka, K., "Peroxotungstic Acid Coated Films for Electrochromic Display Devices," Japanese Journal of Applied Physics, 25:9, (1986), pp. 1420-1426.

(Continued)

*Primary Examiner* — James A Fiorito
(74) *Attorney, Agent, or Firm* — Casimir Jones SC; Lisa Mueller

(57) ABSTRACT

The present disclosure relates to tungsten oxide composition. Specifically, the present disclosure relates to mesoporous tungsten oxide composition that is active for multiple reactions, including aromatic alkylation, alkene coupling, alkene cyclization, alkyne oxidation, alcohol dehydrogenation reactions.

12 Claims, 13 Drawing Sheets

(56) References Cited

OTHER PUBLICATIONS

Marques, A.C. et al., "Office Paper Platform for Bioelectrochromic Detection of Electrochemically Active Bacteria using Tungsten Trioxide Nanoprobes," Scientific Reports, 5:1 9910, (2015), pp. 1-7.

* cited by examiner

MESOPOROUS TUNGSTEN OXIDE COMPOSITION

STATEMENT OF GOVERNMENT SUPPORT

This invention was made with government support under Grant #DE-FG02-86ER13622 awarded by the U. S. Department of Energy. The government has certain rights in the invention.

BACKGROUND

1. Field of the Discovery

The present disclosure relates to tungsten oxide catalyst. Specifically, the present disclosure relates to mesoporous tungsten oxide catalyst that is active for multiple reactions, including aromatic alkylation, alkene coupling, alkene cyclization, alkyne oxidation, alcohol dehydrogenation reactions.

2. Background Information

Tungsten oxide is a versatile transition metal oxide with photochromic, electrochromic, thermochromic, photocatalytic water oxidative, dye degradation, gas sensing, energy storage and thermochemical catalytic properties. However, theoretical explanations to most of the above properties remain unclear as most models fall short in elucidating mechanisms in depth. The thermochemical catalytic activity of $WO_x$ is economically important as this acid catalyst can drive industrially vital multiple reactions including disproportionation, olefin metathesis, aromatic alkylation, epoxidation, hydrogenation and oxidation of sulfur-containing compounds. Even though most of the above organic reaction pathways have been deduced, little attention was paid to understand the relationship between the chemistry of the crystal lattice structure and the reaction pathways which brings us back to the enigma of the theoretical explanations.

Reportedly, tungsten oxide can show six main Bravais lattice structures including monoclinic II (below −43° C.), triclinic (−43 to 17° C.), monoclinic I (17-330° C.), orthorhombic (330-740° C.), tetragonal (above 740° C.), as well as hexagonal, and cubic. However, the crystal phase transition temperature of $WO_x$ depends on the annealing conditions as well as the domain sizes. Therefore, drawing a clear-cut phase boundary for $WO_x$ would be practically problematic. Yet, optimization of the ordered tunnel structures of different phases of $WO_x$ would be important in designing meso-microporous thermochemical catalysts. Recent high-resolution transmission microscopic evidence along with nitrogen adsorption desorption isotherms verify the existence of a microporous hexagonal $WO_x$ tunnel structure which can be utilized in selective gas sensing and ion conductivity applications. However, the thermochemical catalytic activity of microporous materials is limited by the dimensions of the substrate molecules. Hence, a combination of microporous (for efficient ion channeling) and mesoporous (catalytic sites) thermochemical catalyst with high surface area would be more advantageous than conventional monomodal mesoporous catalysts. A general approach to synthesize mesoporous transition metal oxides was reported by Poyraz, A. S. et al. *Nature Communications,* 4:2952 (2013). However, the method was not extended to tungsten oxide due to the limitations in the solubility of the salts.

Aromatic alkylation is one of the most important reactions in chemical synthesis, pharmaceutical and petrochemical industries. Friedel-Craft alkylation which utilizes Lewis acids is considered to be the method of choice for aromatic alkylation over hundreds of years. However, use of stoichiometric amounts of catalyst, acid by-product formation, requirement of alkyl halide, multiple substitutions, and catalytic inactivation by alkyl halides limit the efficiency of the reaction. As a result, inactivation resistant catalysts which require lower loading amounts emerged along with the use of less toxic substituents such as alcohols and alkenes. Wimaliasena et al., *J. Org. Chem.* 63(9):2858 (1998), reported use of p-toluenesulfonic acid monohydrate (TsOH) as a catalyst for the haloalkene, alkenes, alkyl halides, tosylates, and toluene cross-coupling reactions. Toluene cyclohexene cross-coupling reaction catalyzed by zeolites and Filtrol-24 clays was reported by van Bekkum et al., *Catal. Letters* 85 (1/2):7 (2003). Later in 2005, use of Keggin heteropoly acids such as tungstophosphoric and molybdophosphoric acids as catalysts for toluene cyclohexene cross-coupling reaction was reported, *Appl. Catal. A Gen.* 287(1):1 (2005). Further, in 2007, patent application publication WO2007104798A2 disclosed the use of polysaccharide based carbonaceous material in the production of cyclohexylphenol, and in 2008, U.S. Pat. No. 7,579,511 disclosed the cyclohexylbenzene synthesis by benzene hydrogenation. However, all the above publications embraced more of an organic chemistry approach rather than design and development of inorganic catalysts.

There is a need in the art to develop inorganic catalysts with higher catalytic efficiency. Tungsten exists as a potential metal for catalytic applications. Therefore, there is a need to understand the relationship between the crystal lattice structure of a $WO_x$ catalyst and the unsaturated hydrocarbon reaction chemistry.

SUMMARY

The present disclosure relates to tungsten oxide composition that is active for multiple catalytic reactions, including aromatic alkylation, alkene coupling, alkene cyclization, alkyne oxidation, alcohol dehydrogenation reactions, wherein the catalyst having a bimodal pore size distribution for the thermochemical reactions. Previous attempts to make mesoporous $WO_x$ catalysts were unsuccessful, and therefore, the described $WO_x$ products and methods are surprising and unexpected. Thus, in one aspect, the present disclosure relates to tungsten oxide composition comprising micropores and mesopores, wherein the micropores have average diameter less than 2 nm and mesopores have average diameter from 2 to 50 nm.

In one specific aspect, the present disclosure relates to a tungsten oxide composition comprising microporous and mesoporous, wherein the micropores have average diameter of about 0.6 nm as determined by fitting the low pressure carbon dioxide adsorption-desorption isotherms at 298K data to the non-local density functional theory model, and mesopores have average diameter of about 3.4 nm to 3.8 nm as determined by fitting the nitrogen adsorption-desorption isotherm data to the Barrett-Joyner-Halenda model.

In another aspect, the present disclosure relates to a tungsten oxide composition comprising an orthorhombic phase at room temperature. In one aspect, the orthorhombic phase has a crystal unit cell parameters of a=7.359 Å, b=12.513 Å, and c=7.704 Å. In another aspect, the orthorhombic phase has the lattice growth direction is perpendicular to the (200) planes.

In yet another aspect, the present disclosure relates to a tungsten oxide composition comprising $H^+$ ions.

In one aspect, the present disclosure relates to tungsten oxide composition comprising microporous and mesoporous, wherein the micropores have average diameter less than 2 nm and mesopores have average diameter from 2 to 50 nm, and tungsten oxide composition comprising a hexagonal phase at room temperature.

In one aspect, the tungsten oxide composition of present disclosure provides the electron paramagnetic resonance spectra with a proportionality factor of 1.99 and a number of unpaired electron spins equal or higher than $1.0 \times 10^{15}$. In one specific aspect, the number of unpaired electron spins equal or higher than $1.0 \times 10^{17}$.

In one aspect, the tungsten oxide composition of present disclosure has a photochromic color change from brown to blue upon 514 nm laser light irradiation for more than 30 seconds.

In one aspect, the present disclosure provides a method of performing a catalytic chemical reaction comprising the steps of: providing the tungsten oxide composition of claim 1 and at least one reagent; and performing the catalytic chemical reaction of the at least one reagent in the presence of the tungsten oxide composition. Specifically, the tungsten oxide composition of the present disclosure can be used in aromatic alkylation, alkene coupling, alkene cyclization, alkyne oxidation, or alcohol dehydrogenation reactions.

In another aspect, the tungsten oxide composition of the present disclosure can be used in different industrial applications, including but not limited to, the "Benzout" technology in the petroleum refining process, Hock type benzene alkylation, linear alkylbenzene detergent manufacturing process, and Heck-type catalyst in the chemical manufacturing industry.

Further aspects, features, and advantages of the present disclosure will be apparent to those of ordinary skill in the art upon examining and reading the following Detailed Description of the Preferred Embodiments.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION

Figure 1:
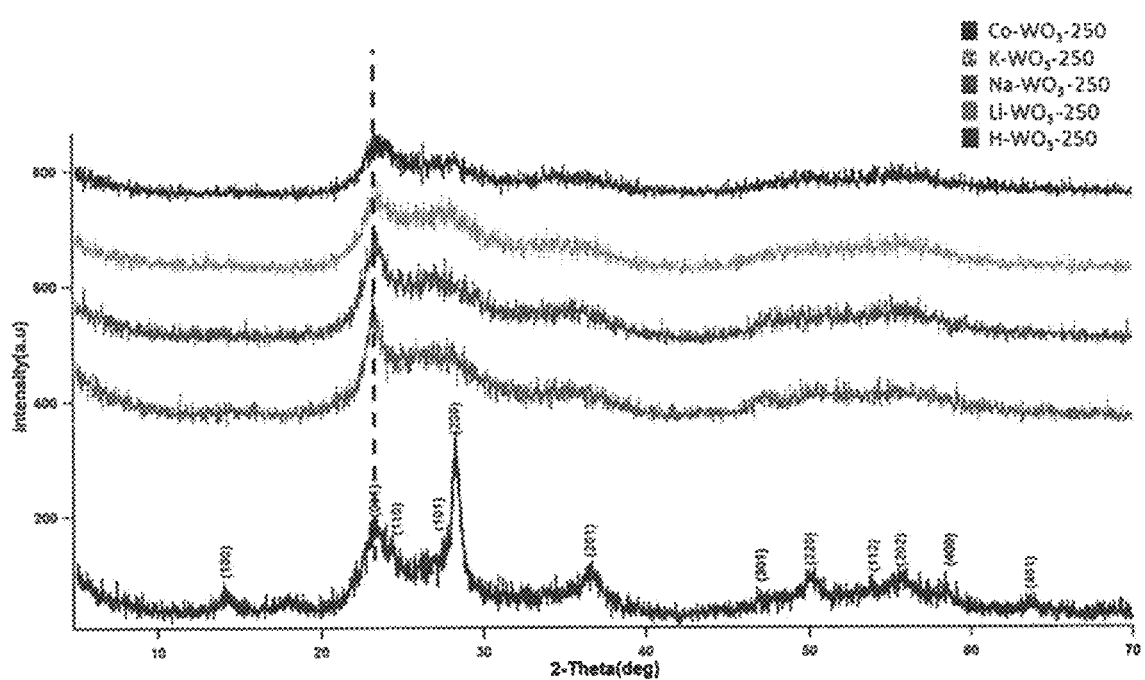
FIG. 1 illustrates the X-ray diffraction patterns of different ion incorporated tungsten oxide calcined at 250° C.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

The present description provides mesoporous hexagonal tunnel structured tungsten oxide catalyst that is active for multiple reactions, including aromatic alkylation, alkene coupling, alkene cyclization, alkyne oxidation, alcohol dehydrogenation reactions.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The in-situ phase change of tungsten oxide ("$WO_3$") follows the order of monoclinic (17° C.-330° C.), orthorhombic (330° C.-740° C.), and tetragonal (>740° C.). Pokhrel, S. et al. *Cryst Eng Comm* 2015, 17 (36), 6985. Considering the fact that the above phase changes are reversible, monoclinic should be the only phase one should observe in a conventional room temperature XRD. However, in one aspect, the disclosure provides a room temperature orthorhombic phase of $WO_3$.

In another aspect, the present disclosure relates to novel tungsten oxide composition with both mespores and micropores. The micropores act as ion transport channels in the tungsten oxide lattice while the mesopores behave as reaction pockets. The active sites of the catalyst are composed of radical oxygen centers which arise due to the deformation of corner-sharing $WO_3$ octahedra.

In one aspect, the present disclosure provides tungsten oxides composition comprising micropores and mesopores, wherein the micropores have average diameter less than 2 nm and mesopores have average diameter from 2 to 50 nm.

In one specific aspect, the present disclosure relates to a tungsten oxide composition comprising microporous and mesoporous, wherein the micropores have average diameter of about 0.6 nm as determined by fitting the low pressure carbon dioxide adsorption-desorption isotherms at 298K data to the non-local density functional theory model, and mesopores have average diameter of about 3.4 nm to 3.8 nm as determined by fitting the nitrogen adsorption-desorption isotherm data to the Barrett-Joyner-Halenda model. Note that the method to measure the particle size is not particular limited.

In another aspect, the present disclosure relates to a tungsten oxide composition comprising an orthorhombic phase at room temperature. In one aspect, the orthorhombic phase has a crystal unit cell parameters of a=7.359 Å, b=12.513 Å, and c=7.704 Å. In another aspect, the orthorhombic phase has the lattice growth direction is perpendicular to the (200) planes.

In yet another aspect, the present disclosure relates to a tungsten oxide composition comprising $H^+$ ions. According to Yamanaka, K. et al., *Jpn J. Appl. Phys* 1986, 25, when metallic tungsten is dissolved in aqueous hydrogen peroxide, an acidic peroxotunsgtic acid solution was formed. Furthermore, the condensation of the product would result in a hydrated form of peroxotunsgtic acid. Heating of the sample above 100° C. promotes the dehydration and polymerization which will lead to corner sharing octahedra of $WO_3$. Since, the $WO_3$ lattice formation of all the five samples is occurring in acidic media (peroxotungtic and nitric acid), orthorhombic H—$WO_3$ formation cannot be ascribed only to the proton effect. Even though, for simplicity, samples were labeled according to the name of the guest ion, all the samples contain $H^+$ ions other than the respective guest ion. Marques, A. C. et al., *Sci. Rep.* 2015, 5 (1), 9910, reported the formation of different tungsten oxide phases as a function of pH, structure directing agent (SDA), and salts of the starting materials. In addition, the report mentions that a monoclinic to orthorhombic to hexagonal (similar to in-situ XRD) phase change is feasible when the pH of the initial solution is tuned from pH 0 to 1.8 under different SDAs. Due to the fact that the initial pH of the solutions of the current study was maintained at a constant value of pH=0, the effect of pH (protons) to the phase changes can be isolated. Hence, a conclusion can be reached that the Li$^+$, Na$^+$, K$^+$, and Co$^{2+}$ guest ions are responsible for the distortion of the orthorhombic lattice to the monoclinic phase. The change in the crystal lattice growth direction can be illustrated using the intensity changes in the XRD patterns. It is observed that in the orthorhombic H—WO$_3$ sample, the lattice growth direction is perpendicular to the (200) planes while in all other samples the growth direction is perpendicular to the (001) planes. A slight high angle shift in the (001) peak of the monoclinic phase with respect to the orthorhombic phase can be ascribed to lattice shrinkage in the direction perpendicular to the (001) planes. An orthorhombic to hexagonal phase transformation upon heating above 350° C. can be attributed to further dehydration of the lattice. The increase in the peak intensity and the decrease in the peak width also demonstrate the crystal domain growth at elevated temperatures (>350° C.).

In one aspect, the present disclosure relates to tungsten oxide composition comprising microporous and mesoporous, wherein the micropores have average diameter less than 2 nm and mesopores have average diameter from 2 to 50 nm, and tungsten oxide comprises a hexagonal phase at room temperature.

In one aspect, the tungsten oxide composition of present disclosure provides the electron paramagnetic resonance spectra with a proportionality factor of 1.99 and a number of unpaired electron spins equal or higher than 1.0×10$^{15}$. In one specific aspect, the number of unpaired electron spins equal or higher than 1.0×10$^{17}$.

In one aspect, the tungsten oxide composition of present disclosure has a photochromic color change from brown to blue upon 514 nm laser light irradiation for more than 30 seconds.

In one aspect, the present disclosure provides a method of performing a catalytic chemical reaction comprising the steps of: providing the tungsten oxide composition of claim 1 and at least one reagent; and performing the catalytic chemical reaction of the at least one reagent in the presence of the tungsten oxide composition. Specifically, the tungsten oxide composition of the present disclosure can be used in aromatic alkylation, alkene coupling, alkene cyclization, alkyne oxidation, or alcohol dehydrogenation reactions. In a non-limiting example, excellent catalytic performance for the cyclohexene-aromatic cross coupling reactions with over 99% conversion and 94% selectivity within 2 hours at 110° C. under air was observed. When the ordered hexagonal channels of tungsten oxide were exchanged with Li$^+$, Na$^+$, K$^+$ and Co$^{2+}$, the surface area of the materials were decreased along with decreased catalytic performance indicating the importance of the hexagonal channels to the catalytic performance.

In another aspect, the tungsten oxide composition of the present disclosure can be used in different industrial applications, including but not limited to, the "Benzout" technology in the petroleum refining process, Hock type benzene alkylation, linear alkylbenzene detergent manufacturing process, and Heck-type catalyst in the chemical manufacturing industry.

Further aspects, features, and advantages of the present disclosure will be apparent to those of ordinary skill in the art upon examining and reading the following Detailed Description of the Preferred Embodiments.

EXAMPLES

The embodiments described above in addition to other embodiments can be further understood with reference to the following examples:

Synthesis of Mesoporous Tungsten Oxide

High surface area (98 m$^2$/g) mesoporous tungsten oxide (WO$_3$) hexagonal rods were synthesized by gas template technique.

Specifically, tungsten metal (99.95%) was completely dissolved in excess 30% (w/w) hydrogen peroxide in argon atmosphere without any mechanical stirring. The water in the clear solution was slowly evaporated by heating the solution at 100° C. for 2 hours. The solution was added dropwise into sonicating 15 g of 1-butanol in a beaker. 2.5 g of 70% nitric acid was added into the resulting solution followed by a 1.5 g of P123 (Poly(ethylene glycol)-block-poly(propylene glycol)-block-poly(ethylene glycol)). The clear solution was stirred for 2 hours at 70° C. The solution was placed in a constant temperature oven at 120° C. for 2-3 hours. The resulting product was washed with absolute ethanol (45 mL) at least for three times followed by centrifugation at 6000 rpm for 10 minutes. The precipitate was vacuum dried at 40° C. for 12 hours. The dried product was calcined at 150° C. for 12 hours at 5° C./min ramp rate under air. Further calcinations were performed at different temperatures (2 hours in air) as shown in the result section.

Thus, in an additional aspect, the disclosure provides a mesoporous tungsten oxide catalyst prepared according to the method of: dissolving tungsten metal (e.g., 99.95%) in hydrogen peroxide (e.g., excess 30% (w/w)) in an inert atmosphere (e.g., argon atmosphere). In certain embodiments, the tungsten metal and peroxide are combined without any mechanical stirring. In certain embodiments, the solution is heated at 100° C. for about 2 hours to evaporate the water. In certain embodiments, the method includes a step of adding the solution dropwise into sonicating 15 g of 1-butanol in a beaker. In certain embodiments, 2.5 g of 70% nitric acid was added into the resulting solution followed by a 1.5 g of P123 (Poly(ethylene glycol)-block-poly(propylene glycol)-block-poly(ethylene glycol)), and the clear solution is stirred for 2 hours at 70° C. In additional embodiments, the solution is placed in a constant temperature oven at about 120° C. for approximately 2-3 hours. In certain embodiments, the resulting product is washed with absolute ethanol (45 mL) at least for three times followed by centrifugation at about 6000 rpm for about 10 minutes. In certain embodiments, the precipitate was vacuum dried at about 40° C. for approximately 12 hours. In an additional embodiment, the dried product is calcined at about 150° C. for about 12 hours at about 5° C./min ramp rate under air.

In certain embodiments, the disclosure provides a mesoporous tungsten oxide made according to a process comprising the steps of: dissolving tungsten metal in hydrogen peroxide in an inert atmosphere; heating the solution at about 100° C., e.g., for about 2 hours, to evaporate the water; adding the solution drop-wise into sonicating 1-butanol in a beaker; adding 70% nitric acid into the resulting solution followed by poly(ethylene glycol)-block-poly(propylene glycol)-block-poly(ethylene glycol); stirring, e.g., for about 2 hours, at 70° C.; heating the solution at about 120° C., e.g., for approximately 2-3 hours; washing with absolute ethanol at least three times followed by centrifugation at about 6000 rpm, e.g., for about 10 minutes, to form a precipitate; drying the precipitate under a vacuum at about 40° C., e.g., for approximately 12 hours; and calcining the dried product is at about 150° C., e.g., for about 12 hours, at about 5° C./min ramp rate under air.

In an additional embodiment, the disclosure provides a method of making a mesoporous tungsten oxide comprising: dissolving tungsten metal (e.g., 99.95%) in hydrogen peroxide (e.g., excess 30% (w/w)) in an inert atmosphere (e.g., argon atmosphere). In certain embodiments, the tungsten metal and peroxide are combined without any mechanical stirring. In certain embodiments, the solution is heated at 100° C. for about 2 hours to evaporate the water. In certain embodiments, the method includes a step of adding the solution dropwise into sonicating 15 g of 1-butanol in a beaker. In certain embodiments, 2.5 g of 70% nitric acid was added into the resulting solution followed by a 1.5 g of P123 (Poly(ethylene glycol)-block-poly(propylene glycol)-block-poly(ethylene glycol)), and the clear solution is stirred for 2 hours at 70° C. In additional embodiments, the solution is placed in a constant temperature oven at about 120° C. for approximately 2-3 hours. In certain embodiments, the resulting product is washed with absolute ethanol (45 mL) at least for three times followed by centrifugation at about 6000 rpm for about 10 minutes. In certain embodiments, the precipitate was vacuum dried at about 40° C. for approximately 12 hours. In an additional embodiment, the dried product is calcined at about 150° C. for about 12 hours at about 5° C./min ramp rate under air. Further calcinations were performed at different temperatures (2 hours in air) as shown in the result section.

In certain embodiments, the disclosure provides a method of making a mesoporous tungsten oxide comprising the steps of: dissolving tungsten metal in hydrogen peroxide in an inert atmosphere; heating the solution at about 100° C., e.g., for about 2 hours, to evaporate the water; adding the solution drop-wise into sonicating 1-butanol in a beaker; adding 70% nitric acid into the resulting solution followed by poly(ethylene glycol)-block-poly(propylene glycol)-block-poly(ethylene glycol); stirring, e.g., for about 2 hours, at 70° C.; heating the solution at about 120° C., e.g., for approximately 2-3 hours; washing with absolute ethanol at least three times followed by centrifugation at about 6000 rpm, e.g., for about 10 minutes, to form a precipitate; drying the precipitate under a vacuum at about 40° C., e.g., for approximately 12 hours; and calcining the dried product is at about 150° C., e.g., for about 12 hours, at about 5° C./min ramp rate under air.

Characterization of Mesoporous Tungsten Oxide

The tungsten oxides of the present disclosure were characterized by X ray diffraction (XRD), scanning electron microscopy (SEM), Transmission electron microscopy (TEM), X ray photoelectron spectroscopy (XPS), Raman spectroscopy and nitrogen adsorption-desorption isotherm.

X-ray diffraction (XRD) was employed to identify the crystal phases and phase purities of the samples. Orthorhombic and monoclinic phases of tungsten oxide were observed in the XRD patterns as shown in FIG. 1. When the guest ion is $H^+$, the orthorhombic $H_{0.66}WO_{3.33}$ phase with a=7.3590 Å, b=12.5130 Å, c=7.7040 Å (ICDD card number 01-072-0199) was observed while the monoclinic phase with a=7.2970 Å, b=7.5390 Å, c=7.6880 Å (ICDD card number 00-043-1035) was perceived in the case of $Li^+$, $Na^+$, $K^+$, or $Co^{2+}$. Even though all samples were synthesized under similar experimental conditions (except the guest metal ion), the crystallinity of the orthorhombic H—$WO_3$ is higher compared to the other four samples. The (001) diffraction peak was slightly shifted to a higher diffraction angle along with an increase in the ionic radius of the guest ion.

Figure 2:
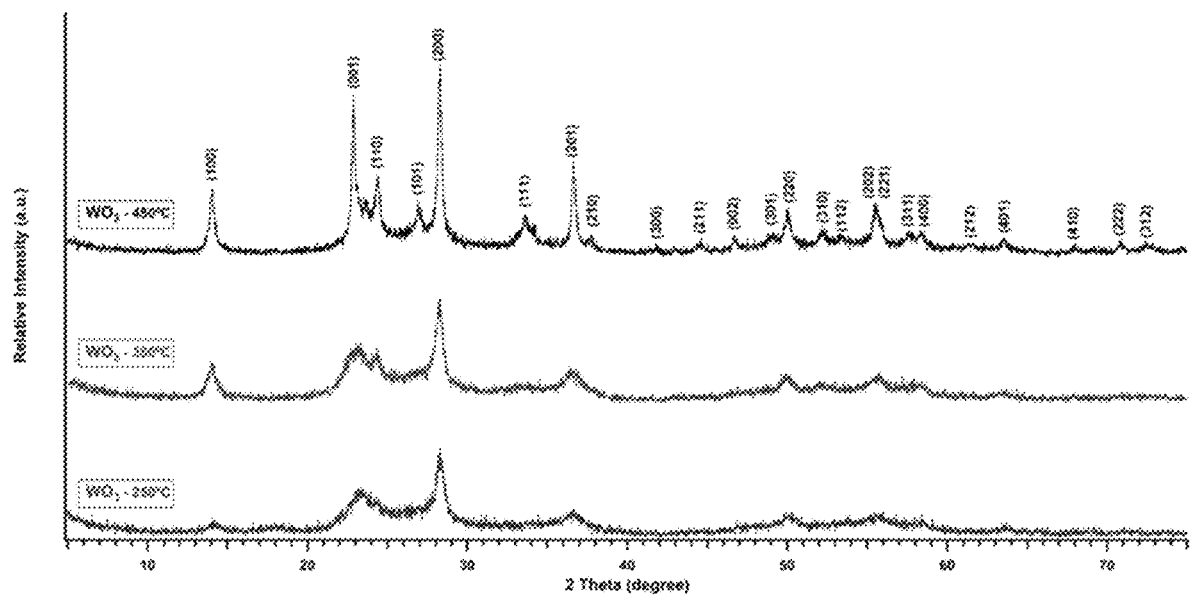
FIG. 2 illustrates the X-ray diffraction patterns of H—$WO_3$ calcined at 250° C., 350° C., 450° C.

The orthorhombic H—$WO_3$ sample was calcined at different temperatures (350° C., 450° C.) and the obtained XRD patterns were compared with those of the 250° C. calcined sample as shown in FIG. 2. When the calcination temperatures were 350° C. and 450° C., the hexagonal phase of tungsten oxide was observed. An increase in the crystallinity was noticed along with the increase in the calcination temperature.

Figure 3:
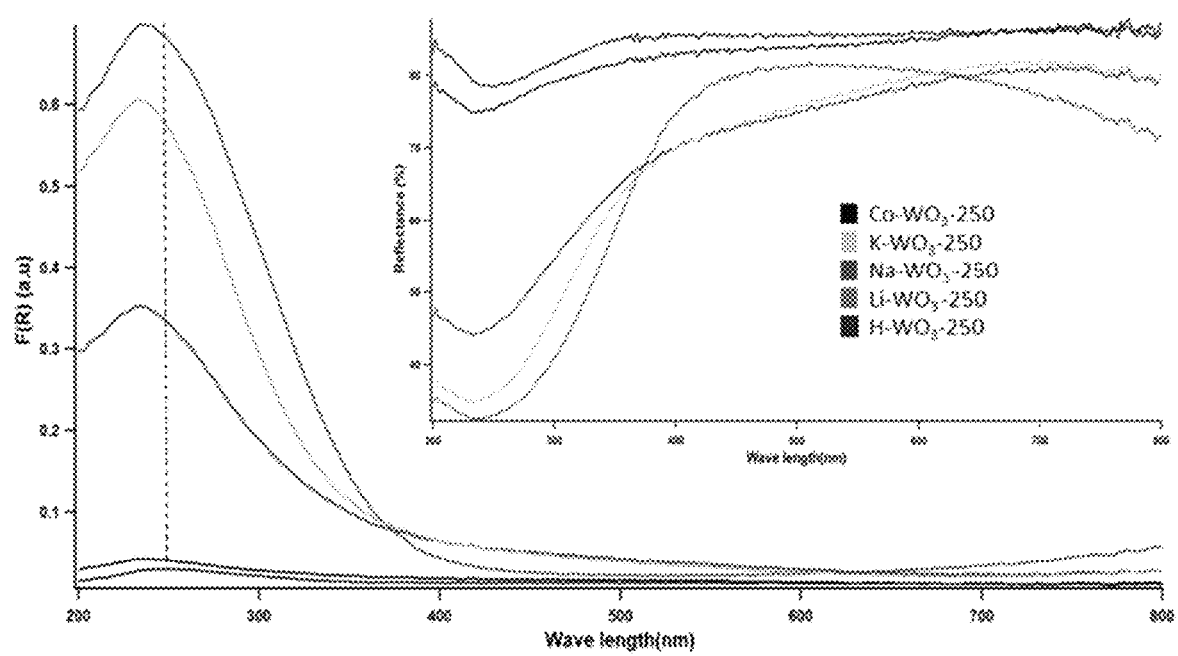
FIG. 3 illustrates the diffuse reflectance spectra (inset) and Kubelka-Munk transformed diffuse reflectance spectra (left) of different ion incorporated $WO_3$ calcined at 250° C.

UV-visible diffuse reflectance analysis was performed to understand the electronic and structural properties of the material. Higher UV-visible (especially UV) reflectance was shown by Co—$WO_3$ and H—$WO_3$ compared to other ion incorporated samples as shown in the inset of FIG. 3. However, the UV-visible reflectance spectrum of Li—$WO_3$ has deviated from other samples. The UV-visible diffuse reflectance spectra were transformed to absorbance spectra using the Kubelka-Munk function $F(R)=(1-R)^2/2R$ where R is reflectance, as shown in FIG. 3. UV absorbance peaks around $\lambda_{max}=250$ nm were observed for all the samples. A blue shift in the $\lambda_{max}$ value was noticed when the guest ions other than $H^+$ were introduced. The band gaps (Table 1) of the samples were determined by extrapolating the linear region of the Kubelka-Munk transformed diffuse reflectance spectra. The point at which the extrapolated line crosses the x-axis (wave length) was used to calculate the band gap of each sample. Generally, a decrease in the band gap values of the tungsten oxide samples was perceived along with an increase in the ionic radii of the guest ions.

TABLE 1

Calculated band gaps of different ion incorporated $WO_3$ calcined at 250° C.

| Material | Band gap (eV) | λmax (nm) |
| --- | --- | --- |
| H—WO3 | 3.8 | 250 |
| Li—WO3 | 3.4 | 235 |
| Na—WO3 | 1.9 | 234 |
| K—WO3 | 1.8 | 234 |
| Co—WO3 | 1.6 | 234 |

Figure 4:
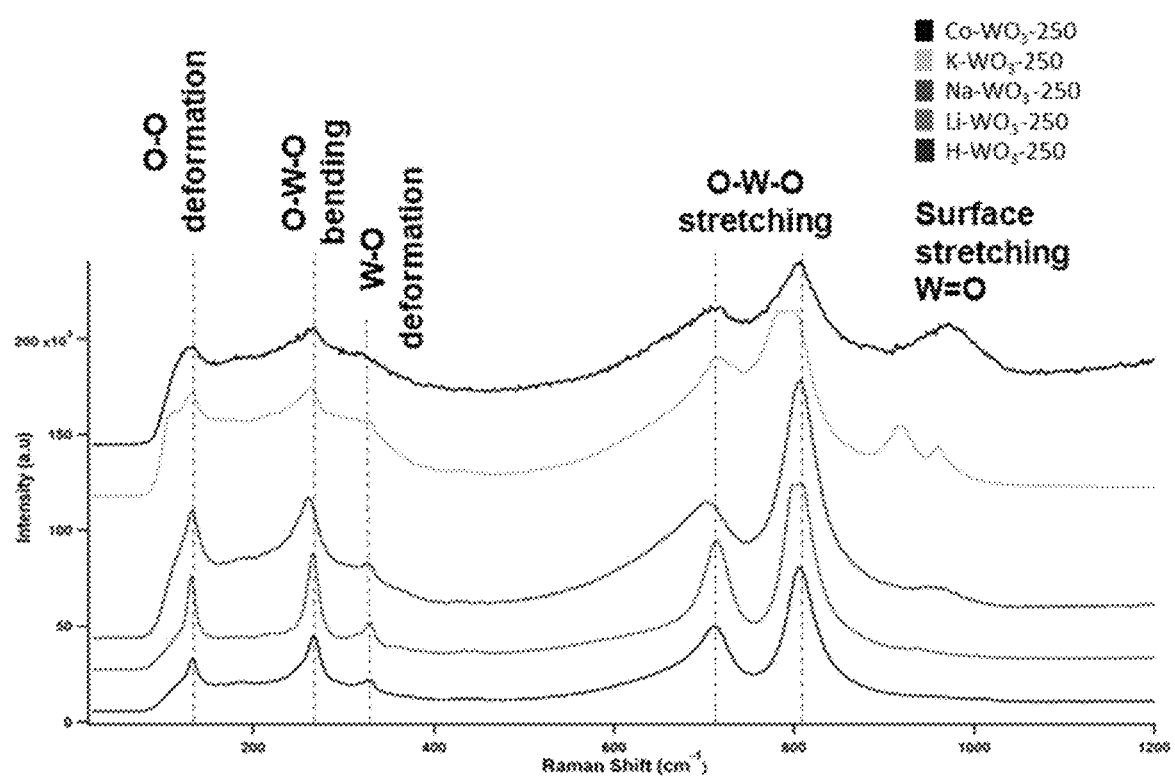
FIG. 4 illustrates a) Raman scattering spectra of different ion incorporated $WO_3$ calcined at 250° C.; b) The picture showing the photochromic color change of H—$WO_3$ upon 514 nm laser irradiation for more than 30 seconds.

The Raman scattering spectra of the above five samples were obtained with a 514 nm laser in order to further understand the crystal structures of tungsten oxide. Six main regions in the spectra were noted as shown in FIG. 4. Compared to H—$WO_3$ and Co—$WO_3$, at least one scattering peak was shifted to a lower frequency in the Raman spectra of the other samples. The peak positions in H—$WO_3$ and Co—$WO_3$ were almost similar except the latter has a broad scattering band above 900 $cm^{-1}$. Direct proportionality between the radius of the guest ion and the intensity of the scattering band above 900 $cm^{-1}$ was noticed. Photochromic color change (brown to blue) was observed in all $WO_3$ samples upon 514 nm laser light irradiation for more than 30 seconds as shown in FIG. 4.

Figure 5:
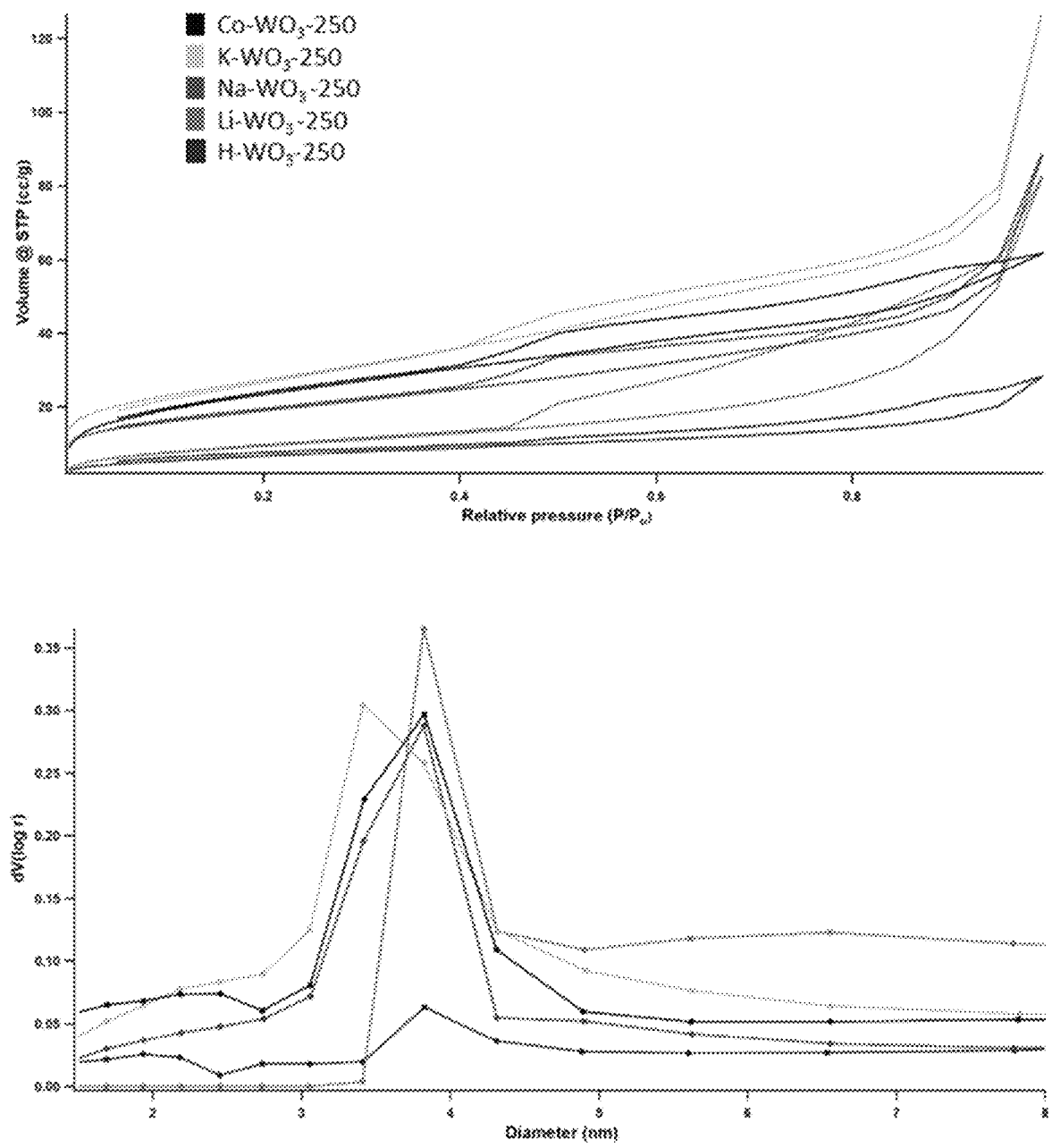
FIG. 5 illustrates Nitrogen adsorption-desorption isotherms recorded at 77 K (top) BJH pore size distribution analysis (bottom) of ion incorporated $WO_3$.

Nitrogen adsorption-desorption isotherms of the five different samples were obtained at 77K as shown in FIG. 5 (top). According to the IUPAC (2015) isotherm classification, all the isotherms were considered as type IV (a) with an H4 hysteresis loop. Rapid adsorption of nitrogen can be seen at low-pressure values ($P/P_0=0.01$) of the adsorption branch of the isotherms. Then a gradual increase in the adsorption up to 0.4 followed by hysteresis in between 0.4-1.0 was noticed. However, saturation plateau of the isotherms near to the saturation vapor pressure of the nitrogen was not witnessed in any of these samples. The initial low-pressure values which can be seen in the adsorption branch were not seen in the desorption branch of the isotherm. Also in K—$WO_3$, desorption and adsorption branches were crossed between $P/P_0=0.2-0.4$. A decrease in the area of the hysteresis loop was detected along with an increase of the ionic radius of the guest ion. The pore size distribution curves were obtained by fitting the isotherm data to the Barrett-Joyner-Halenda (BJH) model. Monomodal mesoporous pore size distribution was attained from the BJH calculations as shown in FIG. 5 (bottom). The Brunauer-Emmett-Teller (BET) method was utilized to calculate the surface area of the samples. All five isotherms were well fit to the BET equation with a correlation coefficient more than 0.9. The summary of pore volume, diameter, and surface area of five different samples is recorded in Table 2.

TABLE 2

BJH pore sizes and BET surface areas calculated from the nitrogen adsorption-desorption isotherms at 77 K of ion incorporated $WO_3$

| Material | Pore volume (cc/g) | Pore diameter (nm) | BET Surface area ($m^2$/g) |
|---|---|---|---|
| H—$WO_3$ | 0.1 | 3.8 | 25 |
| Li—$WO_3$ | 0.1 | 3.8 | 35 |
| Na—$WO_3$ | 0.1 | 3.8 | 68 |
| K—$WO_3$ | 0.2 | 3.4 | 98 |
| Co—$WO_3$ | 0.1 | 3.8 | 86 |

Figure 6:
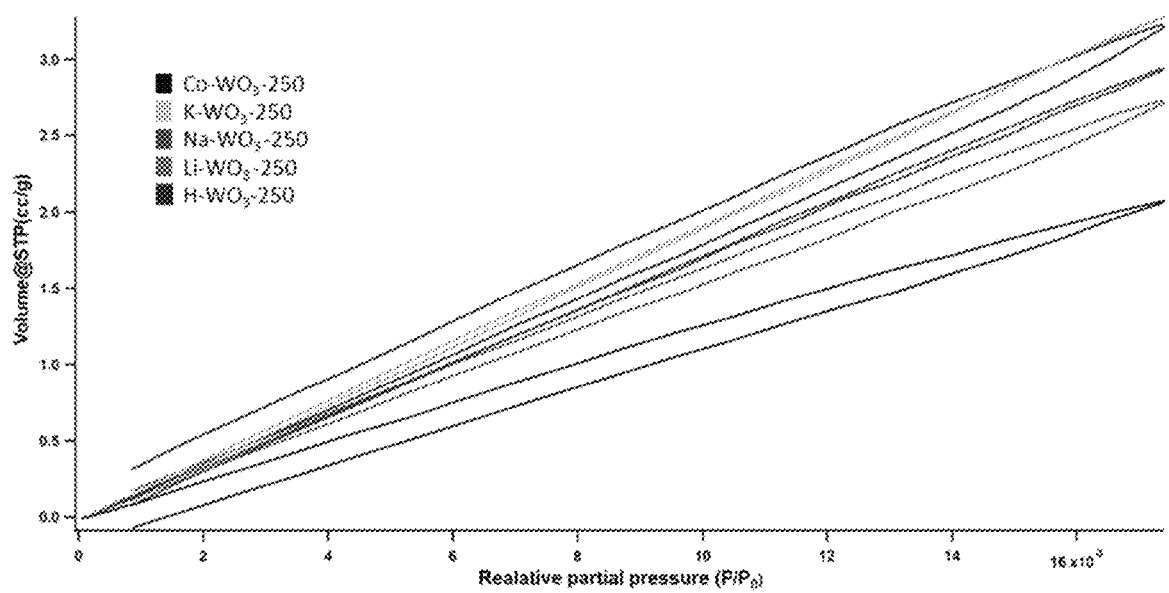
FIG. 6 illustrates the carbon dioxide low-pressure adsorption-desorption isotherms of ion incorporated $WO_3$ recorded at 293 K ($P_0$=48754 mmHg at 298K).

In order to investigate the micropores structures, low pressure carbon dioxide adsorption-desorption isotherms at 298K were obtained. A linear increase in the adsorption was observed with respect to carbon dioxide pressure increment. Different carbon dioxide adsorption capacities were displayed by the five samples at $P/P_0=17\times10^{-3}$ as shown in FIG. 6. Incomplete hysteresis curves were also shown by H—$WO_3$ and Co—$WO_3$ samples. The area of the hysteresis was increased in the order of K—$WO_3$<Na-$WO_3$<Li-$WO_3$<Co-$WO_3$<H—$WO_3$. Suitability of the non-local density functional theory (NLDFT) model for the pores size distribution calculation was evaluated by fitting the isotherm data with a density functional theory (DFT) model and a Monte-Carlo (MC) model. Fitting error for the NLDFT and MC methods were below 0.15% and above 0.20% respectively. Summary of the calculated data is shown in table 3.

Figure 7:
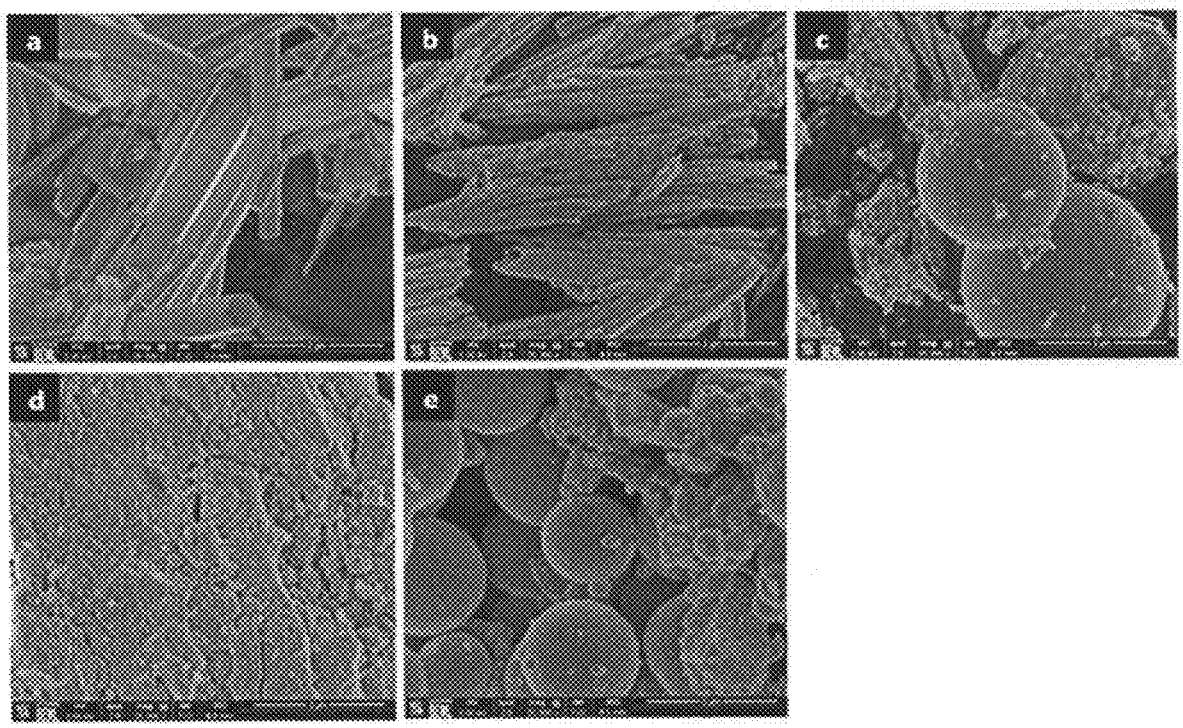
FIG. 7 illustrates scanning electron microscopic (SEM) images of a) H—$WO_3$ b) Li—$WO_3$ c) Na—$WO_3$ d) K—$WO_3$ e) Co—$WO_3$ calcined at 250° C. (scale bar 2 μm).

The scanning electron microscopic (SEM) analysis of the five samples was carried out to understand the morphologies of the particles. Hexagonal rods in H—$WO_3$ and short thin rods in Li—$WO_3$ were observed as shown in FIG. 7. When compared to other samples, different spherical morphology was observed in Na—$WO_3$ and Co—$WO_3$ samples. Large particle aggregation was detected in K—$WO_3$. However, remnants of rods were identified all over the surface of the large particles.

Figure 8:
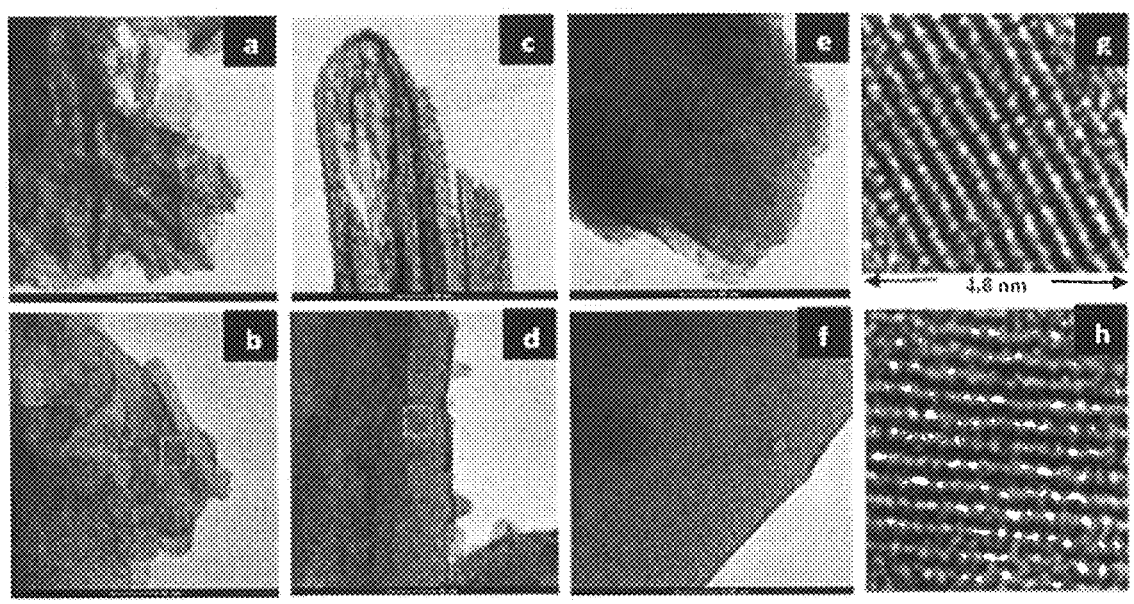
FIG. 8 illustrates High-resolution transmission electron microscopic (TEM) images of a) H—$WO_3$ (20 nm); b) H—$WO_3$ (10 nm); c) Li—$WO_3$ (20 nm); d) Li—$WO_3$ (10 nm); e) Na—$WO_3$ (20 nm); f) Na—$WO_3$ (10 nm); and digital zoomed-in TEM images of g) H—$WO_3$ h) Li—$WO_3$ (orange boxes in a) and b) are zoomed in positions, respectively).

Transmission electron microscopy (TEM) was used to understand the morphology of the crystal domains and lattice parameters of tungsten oxide. Lattice fringes showing hexagonal tunnels were observed in the high-resolution TEM images of H—$WO_3$ and Li—$WO_3$ as outlined in FIG. 8(g, h). The average diagonal length of the hexagons was measured as 3.8 Å which corresponds to the (200) planes of tungsten oxide. Rods with curved ends were found in the Li—$WO_3$ (FIG. 8c) sample while nanosheets were observed in other samples.

Figure 9:
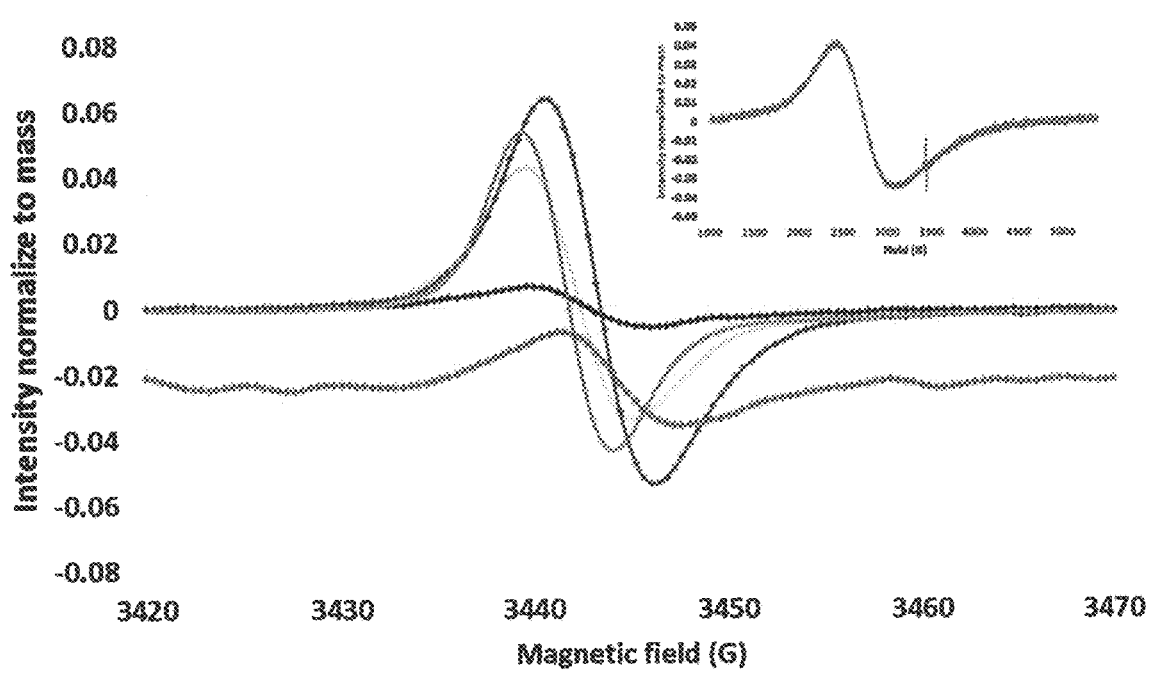
FIG. 9 illustrates the electron paramagnetic resonance spectra of different ion incorporated $WO_3$ (293 K) with inset showing full EPR spectrum of Li—$WO_3$.

The electron paramagnetic resonance (EPR) spectra of above the five samples were obtained in order to understand the electronic structures of the materials. A sharp (~bandwidth 30 G) EPR signal was observed in between 3430 G to 3450 G in all the samples at 293 K as shown in FIG. 9. However, a broad (~4000 G) signal which is shown in the inset of FIG. 9, can only be found in Li—$WO_3$. Intensities of the EPR signals were normalized with respect to the mass of the sample and the number of spins was calculated by double integrating the signal. The highest number of unpaired electron spins was detected in H—$WO_3$. Variations in the signal intensities can be identified in different samples. However, the same proportionality factor (g value) and almost the same asymmetric factors were identified as shown in Table 4.

TABLE 4

Quantitative results obtained from EPR spectra

| Material | g value | Number of spins/g | Asymmetric factor |
|---|---|---|---|
| H—$WO_3$ | 1.99 | $1.2 \times 10^{17}$ | 1.2 |
| Li—$WO_3$ | 1.99 | $1.9 \times 10^{15}$ | 1.2 |
| Na—$WO_3$ | 1.99 | $1.2 \times 10^{15}$ | 1.2 |
| K—$WO_3$ | 1.99 | $6.5 \times 10^{15}$ | 1.3 |
| Co—$WO_3$ | 1.99 | $1.6 \times 10^{15}$ | 1.0 |

Applications of Mesoporous Tungsten Oxide Catalyst

The abilities of the tunnel structured mixed meso-microporous tungsten oxide to catalyze unsaturated alkene reactions were tested by using the cyclohexene-toluene cross-coupling reaction (shown below) as a benchmark. The reaction conditions are given in the footnote of the Table 5. Significant yields were observed only when H—$WO_3$ and Co—$WO_3$ catalysts were used. When the guest ion is Li, $Na^+$ or $K^+$, no significant yields were observed. H—$WO_3$ was selected as the material of interest considering the higher (58% in 1 hour) activity per unit mass of the catalyst. In order to prove the true catalytic nature of the catalyst, several blank experiments were performed and the results were recorded in the Table 6.

TABLE 5

Activity of different ion incorporated $WO_3$ on cyclohexene toluene cross-coupling reaction

| Catalyst | Conversion[1] (%) | Selectivity[2] (%) | Yield (%) | TON | TOF ($h^{-1}$) |
|---|---|---|---|---|---|
| H—$WO_3$ | 58 | >99 | 57 | 1.3 | 1.3 |
| Li—$WO_3$ | <1 | — | — | — | — |
| Na—$WO_3$ | <1 | — | — | — | — |
| K—$WO_3$ | <1 | — | — | — | — |
| Co—$WO_3$ | 36 | >99 | 37 | 0.7 | 0.7 |

If not specified reaction conditions are 20 mg $WO_3$-250, 1 mL toluene, 0.1 mmol Cyclohexene, 1 hour, 110° C., TON—moles of cyclohexene converted per mole of catalyst, TOF—moles of cyclohexene converted per mole of catalyst per hour.
[1]GCMS based. Comm.—Commercial.
[2]selectivity for coupling product, — insignificant value

TABLE 6

Results of the blank tests of cyclohexene toluene coupling reaction

| Condition | Conversion[1] (%) | Selectivity (%) | Yield (%) | TON | TOF ($h^{-1}$) |
|---|---|---|---|---|---|
| Comm. $WO_3$ [2] | <1 | <1 | <1 | 0.02 | 0.01 |
| Room temperature[3] | 5 | 12 | <1 | 0.12 | 0.03 |
| No catalyst[4] | <1 | <1 | <1 | 0.02 | 0.01 |

[1]Conversion was calculated based on the GCMS data.
[2] 10 mg commercial $WO_3$
[3]Room temperature(20° C.)
[4]Without any catalyst. If not specified, the reaction conditions are 10 mg $WO_3$- 250, Toluene 1 mL, Cyclohexene 0.1 mmol, 1 hours, 110° C., TON—moles of substrate converted per mole of catalyst, TOF—moles of substrate converted per mole of catalyst per hour.

The results suggest that the catalyst and a specific reaction temperature must be met in order for the following reaction to happen.

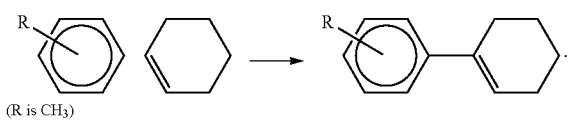

(R is CH₃)

Figure 10:
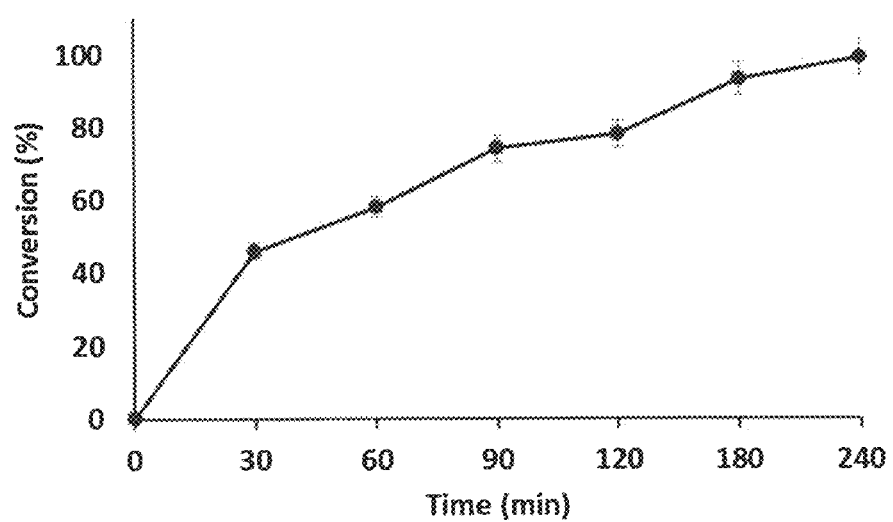
FIG. 10 illustrates the conversion of cyclohexene with respect to time (10 mg H—$WO_3$—250, 1 mL Toluene, 0.1 mmol Cyclohexene, 110° C.).

After the above catalyst screening test, the reaction time was optimized using only 10 mg of H—WO₃ catalyst. A steady increase in the conversion was noticed with respect to time as shown in FIG. 10. The conversion reached 99% within 4 hours with 10 mg of the catalyst.

In the next set of experiments, the reaction temperature was optimized along with the reaction time. A three-dimensional plot was constructed using the data obtained as illustrated in FIG. 10. Less than 5% conversion at 50° C., 30% conversion at 70° C. and 71% conversion at 90° C. were observed after 4 hours of reaction time. Since >99% conversion was achieved by the 110° C. reaction within 4 hours, 110° C. was chosen as the optimal reaction temperature. Integrated rate law plots were constructed using the data of FIG. 10. The reaction kinetic parameters were concluded as pseudo first-order having a rate constant (k) of $1.97 \times 10^{-3}$ at 110° C. (FIG. 1 supporting information). Furthermore, a Arrhenius plot was drawn in order to determine the activation energy of the reaction and the value was recorded as 87.4 kJmol$^{-1}$ (FIG. 2 supporting information).

After the optimization of initial reaction time (FIG. 10), further optimization was performed considering the effect of the catalyst loading. The amount of the catalyst used in the reaction was varied while monitoring the conversion with respect to reaction time. By weighing the two factors, catalyst loading and the reaction time, 20 mg catalyst and 2 hours at 110° C. were selected as the optimal reaction conditions.

Figure 11:
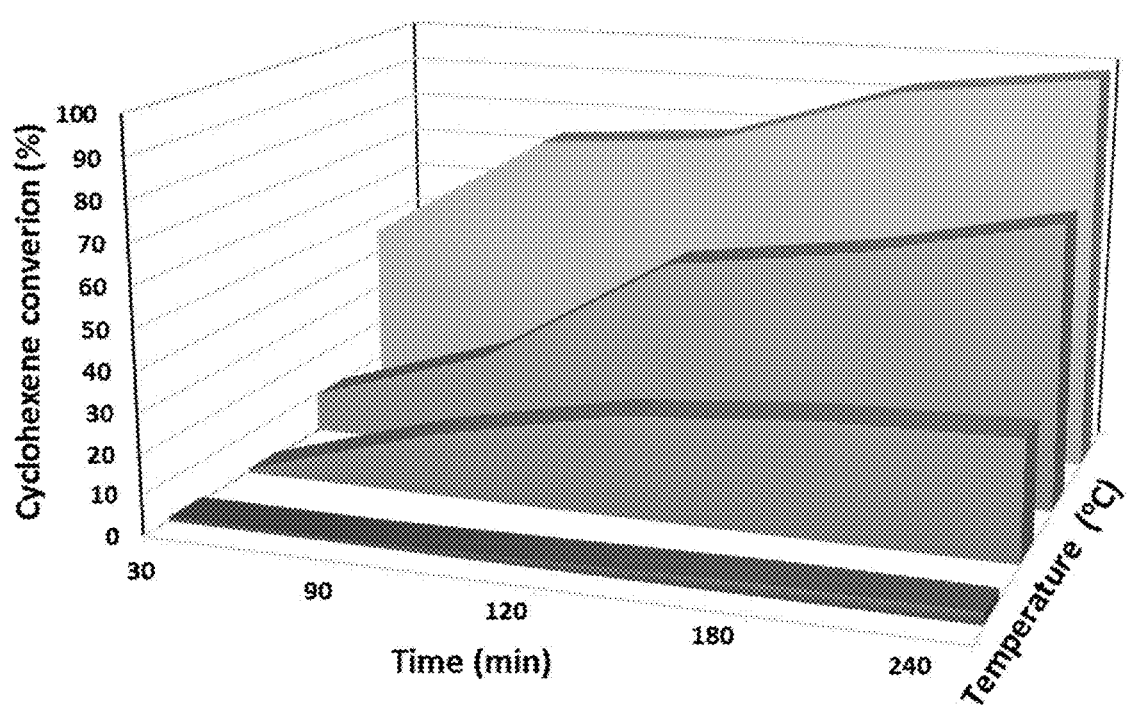
FIG. 11 illustrates the Cyclohexene conversion with respect to time and the temperature (10 mg H—$WO_3$—250, 1 mL Toluene, 0.1 mmol Cyclohexene).
Figure 12:
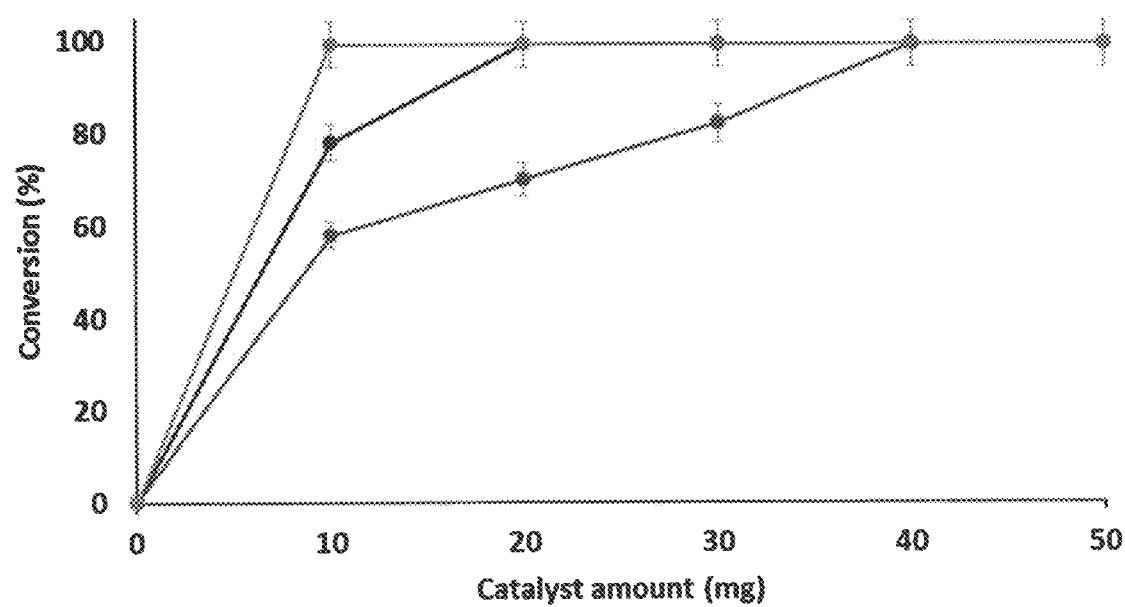
FIG. 12 illustrates the catalyst loading optimization analysis at different reaction time (1 mL Toluene, 0.1 mmol Cyclohexene, 110° C.).
Figure 13:
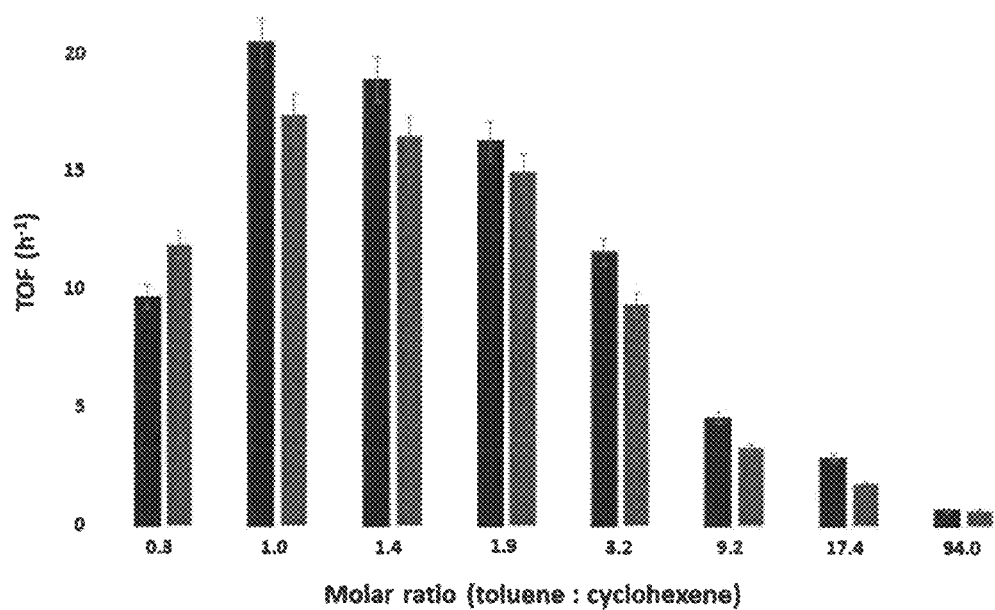
FIG. 13 illustrates Toluene to cyclohexene molar ratio optimization. Black—20 mg H—$WO_3$—250, 2 hours, 110° C. and red—10 mg H—$WO_3$—250, 4 hours, 110° C.

The molar ratio of toluene to cyclohexene was varied to obtain an idea about the molecular kinetics of the reaction. A Gaussian distribution of conversion values with respect to the molar ratios was observed. The highest turnover frequency of about 20 hour$^{-1}$ was detected when the ratio is 1:1 as shown in FIG. 11. A similar pattern in the TOF can be identified even though the catalyst loading and the monitoring time were changed.

Electron density of the aromatic ring in an aromatic alkylation reaction is a crucial parameter in the reaction kinetics. Hence, aromatic compounds with electron donating (ED) and withdrawing (EW) groups were tested for their activity as shown in Table 7. The reaction time was selected as 1 hour in order to obtain comparable results. When benzene is substituted with either strong electron donating or withdrawing groups, no significant conversion was observed. However, considerable conversion was achieved when the substituents were mild ED or EW. In the halogenated aromatic compound series, yield was increased when the electronegativity of the halogen is increased (Br<Cl<F). Conversion of 80% was observed when the aromatic compound is benzene while a comparatively lower conversion was noticed in the case of alkyl substituted (toluene, ethylbenzene) benzene compounds.

TABLE 7

Effect of the electron density of the aromatic ring to the reaction activity

| Substrate | Conv. (%) | Selec. (%) | Yield (%) | TON | TOF (h$^{-1}$) |
|---|---|---|---|---|---|
| Toluene | 58 | >99 | 57 | 0.7 | 0.7 |
| F-benzene | 98 | 90 | 88 | 1.1 | 1.1 |
| Cl-benzene | 39 | 72 | 28 | 0.5 | 0.5 |
| Br-benzene | 24 | 10 | 2 | 0.3 | 0.3 |
| Ethyl benzene | 63 | >99 | 62 | 0.7 | 0.7 |
| Benzene | 81 | >99 | 80 | 0.9 | 0.9 |
| Aniline | <1 | <1 | <1 | — | — |
| NO₂-benzene | <1 | <1 | <1 | — | — |

If not specified reaction conditions-20 mg, WO₃- 250-3, Toluene 1 mL, Cyclohexene 0.1 mmol, 1 hour, 110° C., TON—moles of substrate converted per mole of catalyst, TOF—moles of substrate converted per mole of catalyst per hour (GCMS based).

The effect of the cycloalkene ring properties on the reaction was evaluated using cyclopentene, cyclohexene, and cycloheptene as substrates. The reaction time was decreased to one hour in order to obtain comparable results. When the cycloalkene ring size (number of carbons) was changed in the range of 5, 6, 7 the cycloalkene conversion was changed as illustrated in Table 8. A more in-depth computational analysis was performed in order to determine the thermodynamic properties of the reaction (table 2 supporting information).

TABLE 8

Effect of cycloalkene ring chemistry to the reaction activity

| Substrate | Conv. (%) | Selec. (%) | Yield (%) | TON | TOF (h$^{-1}$) |
|---|---|---|---|---|---|
| Cyclopentene | 96 | >99 | 95 | 6.5 | 6.5 |
| Cyclohexene | 70 | >99 | 69 | 7.6 | 7.6 |
| Cycloheptene | 85 | 93 | 79 | 6.4 | 6.4 |

If not specified reaction conditions - 20 mg WO₃- 250-3, Toluene 1 mL, Cycloalkene 0.1 mmol, 1 hour, 110° C., TON—moles of substrate converted per mole of catalyst, TOF—moles of substrate converted per mole of catalyst per hour (GCMS based).

The main reactive species involved in the reaction was determined using a reactive species scavenger test. Ammonium oxalate (hole scavenger), tertbutyl alcohol (hydroxyl radical scavenger), (2,2,6,6-Tetramethylpiperidin-1-yl)oxyl (TEMPO, a radical scavenger) and sodium azide (singlet oxygen scavenger) were used in these experiments. Less than 1% yield was obtained when the reaction was done with the radical scavenger TEMPO. More than 75% yield was recorded with all other reactive species scavenger experiments as depicted in Table 9.

TABLE 9

Reactive species scavenger studies to determine the reaction mechanism.

| Reactive species scavenger | Conv. (%) | Selec. (%) | Yield (%) | TON | TOF (h$^{-1}$) |
|---|---|---|---|---|---|
| No scavenger | 99 | 96 | 95 | 1.1 | 0.2 |
| Ammonium oxalate | 80 | 98 | 78 | 0.9 | 0.2 |
| tert-butyl alcohol | 83 | 97 | 81 | 1.0 | 0.2 |
| TEMPO | <1 | <1 | <1 | <1 | <1 |
| Sodium azide | 92 | 98 | 90 | 1.0 | 0.3 |

If not specified reaction conditions - 20 mg WO₃- 250-3, Toluene 1 mL, Cyclohexene 0.1 mmol, 4 hours, 110° C., TON—moles of substrate converted per mole of catalyst, TOF—moles of substrate converted per mole of catalyst per hour (GCMS based). Ammonium oxalate- 13.5 mg, tert-butyl alcohol - 10 mg, TEMPO - 10.8 mg, sodium azide - 10.8 mg The tungsten oxide composition of the present disclosure can also be used in other industrial applications. For example, the "benzout" technology is used by modern petroleum refining facilities to reduce the raw benzene content in the crude products. The refining method ensures the production gasoline with desired benzene content which is enforced by the government agencies. In such process, benzene is reacted with olefins such as propene, dodecene in the presence of zeolite or acid-base type catalyst to make alkylated benzene. The tungsten oxide catalyst can be used to do the Benzout process with less energy and higher conversions.

The tungsten oxide composition of the present disclosure can also be used in Hock type benzene alkylation (the Hock process uses the reaction between benzene and propylene to produce cumene. Cumene is further reacted with oxygen to generate phenol and acetone as shown below. This is considered as the most popular method of producing acetone and phenol in the industry); linear alkylbenzene detergent manufacturing process (the detergent manufacturing process utilizes Friedel Craft alkylation of benzene with solid acid catalysts such as zeolites, supported aluminum chloride, clays, metal oxides; benzene, an abundant side product of the oil refining technology, is reacted with the long chain alkene to produce the backbone of the surfactant molecules); Heck-type catalyst in the chemical manufacturing industry.

EXEMPLARY EMBODIMENTS

A tungsten oxide composition comprising micropores and mesopores, wherein the micropores have an average diameter less than 2 nm and mesopores have average diameter from 2 to 50 nm. In any of the aspects or embodiments described herein, the micropores have average diameter of about 0.6 nm as determined by fitting the low pressure carbon dioxide adsorption-desorption isotherms at 298K data to the non-local density functional theory model, and mesopores have average diameter of about 3.4 nm to 3.8 nm as determined by fitting the nitrogen adsorption-desorption isotherm data to the Barrett-Joyner-Halenda model. In any of the aspects or embodiments described herein, the tungsten oxide composition comprises an orthorhombic phase at room temperature.

In any of the aspects or embodiments described herein, the tungsten oxide composition comprises $H^+$ ions.

In any of the aspects or embodiments described herein, the orthorhombic phase has a crystal unit cell structure of a=7.359 Å, b=12.513 Å, and c=7.704 Å.

In any of the aspects or embodiments described herein, the lattice growth direction of the tungsten oxide composition is perpendicular to the (200) planes.

In any of the aspects or embodiments described herein, the tungsten oxide composition comprises a hexagonal phase at room temperature.

In any of the aspects or embodiments described herein, the electron paramagnetic resonance spectra of the tungsten oxide composition have a proportionality factor of 1.99 and a number of unpaired electron spins equal or higher than $1.0 \times 10^{15}$.

In any of the aspects or embodiments described herein, the tungsten oxide composition comprises a number of unpaired electron spins equal or higher than $1.0 \times 10^{17}$.

In any of the aspects or embodiments described herein, the tungsten oxide composition has a photochromic color change from brown to blue upon 514 nm laser light irradiation for more than 30 seconds.

In another aspect, the disclosure provides methods of performing a catalytic chemical reaction comprising the steps of: providing the tungsten oxide composition as described herein, and at least one reagent; and performing the catalytic chemical reaction of the at least one reagent in the presence of the tungsten oxide composition.

In any of the aspects or embodiments described herein, the catalytic chemical reaction is at least one of aromatic alkylation, alkene coupling, alkene cyclization, alkyne oxidation, or alcohol dehydrogenation.

In an additional aspect, the disclosure provides a method of making a mesoporous tungsten oxide comprising: dissolving tungsten metal (e.g., 99.95%) in hydrogen peroxide (e.g., excess 30% (w/w)) in an inert atmosphere (e.g., argon atmosphere). In any of the aspects or embodiments described herein, the tungsten metal and peroxide are combined without any mechanical stirring. In any of the aspects or embodiments described herein, the solution is heated at 100° C. for about 2 hours to evaporate the water. In any of the aspects or embodiments described herein, the method includes a step of adding the solution dropwise into sonicating 15 g of 1-butanol in a beaker. In certain embodiments, 2.5 g of 70% nitric acid was added into the resulting solution followed by a 1.5 g of P123 (Poly(ethylene glycol)-block-poly(propylene glycol)-block-poly(ethylene glycol)), and the clear solution is stirred for 2 hours at 70° C. In any of the aspects or embodiments described herein, the solution is placed in a constant temperature oven at about 120° C. for approximately 2-3 hours. In any of the aspects or embodiments described herein, the resulting product is washed with absolute ethanol (45 mL) at least for three times followed by centrifugation at about 6000 rpm for about 10 minutes. In any of the aspects or embodiments described herein, the precipitate was vacuum dried at about 40° C. for approximately 12 hours. In any of the aspects or embodiments described herein, the dried product is calcined at about 150° C. for about 12 hours at about 5° C./min ramp rate under air.

EQUIVALENTS

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A tungsten oxide composition comprising a tungsten oxide having micropores and mesopores, wherein the micropores have average diameter of about 0.6 nm and mesopores have average diameter of about 3.4 nm to about 3.8 nm.

2. The tungsten oxide composition of claim 1, wherein the average diameter of the micropores is determined by fitting the low pressure carbon dioxide adsorption-desorption isotherms at 298K data to the non-local density functional theory model, and the average diameter of the mesopores is determined by fitting the nitrogen adsorption-desorption isotherm data to the Barrett-Joyner-Halenda model.

3. The tungsten oxide composition of claim 1, wherein the tungsten oxide composition comprises an orthorhombic phase at room temperature.

4. The tungsten oxide composition of claim 3, wherein the orthorhombic phase of the tungsten oxide composition comprises $H^+$ ions.

5. The tungsten oxide composition of claim 4, wherein the orthorhombic phase has a crystal unit cell structure of a=7.359 Å, b=12.513 Å, and c=7.704 Å.

6. The tungsten oxide composition of claim 3, wherein the lattice growth direction is perpendicular to the (200) planes.

7. The tungsten oxide composition of claim 1, wherein the tungsten oxide composition comprises a hexagonal phase at room temperature.

8. The tungsten oxide composition of claim 1, wherein the electron paramagnetic resonance spectra of the tungsten oxide composition has a proportionality factor of 1.99, and a number of unpaired electron spins equal or higher than $1.0 \times 10^{15}$.

9. The tungsten oxide composition of claim 8, wherein the number of unpaired electron spins is equal or higher than $1.0 \times 10^{17}$.

10. The tungsten oxide composition of claim 1, wherein the tungsten oxide composition has a photochromic color change from brown to blue upon 514 nm laser light irradiation for more than 30 seconds.

11. A method of performing a catalytic chemical reaction comprising the steps of: providing the tungsten oxide composition of claim 1 and at least one reagent; and performing the catalytic chemical reaction of the at least one reagent in the presence of the tungsten oxide composition.

12. The method of claim 11, wherein the catalytic chemical reaction is at least one of aromatic alkylation, alkene coupling, alkene cyclization, alkyne oxidation, or alcohol dehydrogenation.

* * * * *